United States Patent [19]

Zhivotov

[11] 4,295,386
[45] Oct. 20, 1981

[54] APPARATUS FOR BALANCING BODIES OF REVOLUTION

[76] Inventor: Jury G. Zhivotov, ulitsa Svobody, 4, kv. 148, Dnepropetrovsk, U.S.S.R.

[21] Appl. No.: 19,935

[22] Filed: Mar. 12, 1979

[51] Int. Cl.³ ............................................. F16F 15/22
[52] U.S. Cl. .................................... 74/573 F; 51/169
[58] Field of Search ........................ 74/573 R, 573 F; 51/169; 137/859; 73/458, 468

[56] References Cited

U.S. PATENT DOCUMENTS

| 3,248,967 | 5/1966 | Lewis | 74/573 |
| 3,804,113 | 4/1974 | Garcea | 137/859 |
| 3,812,724 | 5/1974 | Curtz et al. | 74/573 |
| 3,950,897 | 4/1976 | Birkenstack et al. | 51/169 |
| 4,002,086 | 1/1977 | Reinhall | 74/573 F |

FOREIGN PATENT DOCUMENTS 442798  1/1968  Switzerland ..................... 74/573 F Primary Examiner—Kenneth Dorner Attorney, Agent, or Firm—Lackenbach, Lilling & Siegel

[57] ABSTRACT

The apparatus for balancing bodies of revolution includes balancing tanks located peripherally within the body of revolution. Mounted coaxially with the body of revolution is a distributing chamber with conduits hydraulically connecting said distributing chamber with the balancing tanks. The ends of the conduits are disposed inside the distributing chamber and are equidistant from the geometric axis of the body of revolution. Resilient diaphragms are fixed on the wall of the balancing tanks, at the outlet of the conduits. The apparatus for balancing bodies of revolution also comprises a liquid supply source hydraulically associated with the distributing chamber and made in the form of a chamber with a diameter smaller than that of the distributing chamber, and said chamber being located centrally within the body of revolution and forms a tight cavity with the distributing chamber and the portion of the balancing tank defined by the resilient diaphragm.

2 Claims, 4 Drawing Figures

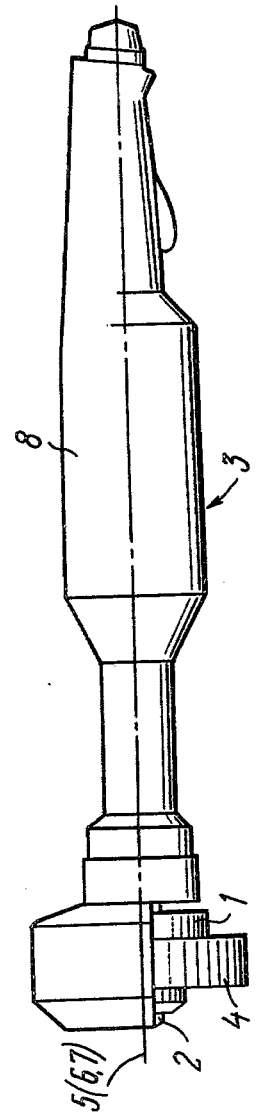
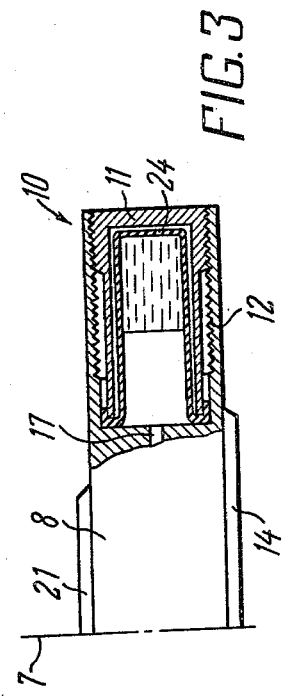

APPARATUS FOR BALANCING BODIES OF REVOLUTION

The present invention relates to an apparatus for balancing movable components of diverse mechanisms and more particularly to an apparatus for balancing bodies of revolution.

FIELD OF THE INVENTION

The proposed invention may be adapted for use in electrotechnical, chemical and metallurgical industries to offset unbalanced of bodies of revolution in various mechanisms at subcritical and supercritical speeds whereat natural oscillation frequency of the body of revolution is superior or inferior to the frequency of rotation, respectively.

BACKGROUND OF THE INVENTION

The necessity for offsetting any unbalance in bodies of revolution is conditioned by the emergence of adverse vibrations of machines with unbalanced rotating bodies of revolution, which reduces the service life and impairs the proper functioning of said machines.

Bodies of revolution (rotors, drums, extractors, grinding wheels) in such machines as centrifuges, washing machines, grinding machines and hand grinders can rotate both about vertical and horizontal axes. Unbalanced bodies of revolution in such machines arise in the process of operation thereof during each operating cycle.

Widely known in the art is an apparatus for balancing bodies of revolution (cf. USSR Inventor's Certificate No. 257,828, cl. G 01M 1/38, 1967) effecting the balancing of bodies of revolution at subcritical speeds of rotation. Said apparatus comprises balancing tanks with drain holes, installed peripherally within the body of revolution, and a central distributing chamber admitting liquid from a liquid supply source. The distributing chamber is provided with conduits connected with the balancing tanks disposed diametrically opposite to the distributing chamber by means of pipelines.

Said apparatus allows one to compensate for the static unbalance of the body of revolution at subcritical rotation speeds and with a strictly vertical position of the axis of rotation of the body of revolution. However, the apparatus calls for an uninterrupted supply of liquid from the source of supply installed in a stationary position outside the rotating body of revolution. As a result, the apparatus is not self-contained. Besides, the apparatus is operable only with the axis of rotation of the body of revolution in a vertical position, for only this position makes the liquid in the distributing chamber flows towards an appropriate conduit, bypassing the inlets to the remaining conduits of the distributing chamber.

Widely known in the art is also an apparatus for balancing bodies of revolution, effecting the balancing of bodies of revolution at supercritical rotation speeds (cf. USSR Inventor's Certificate No. 561,099, cl. G 01M 1/38, 1976). Said apparatus for balancing bodies of revolution comprises balancing tanks mounted peripherally within the body of revolution, and a central distributing chamber admitting liquid from a stationary liquid supply source disposed outside the body of revolution. The distributing chamber is provided with conduits with the ends thereof located inside the distributing chamber and equidistant from the geometric axis of the body of revolution. Pipelines connect the conduits with the balancing tanks in a radial direction. The apparatus is operable irrespective of the position of the axis of rotation of the body of revolution.

When the body is revolution is immobilized, the balancing liquid from the balancing tanks is drained into the environment. Each new operating cycle of the mechanism containing said body of revolution requires a new portion of the balancing liquid to be fed from the liquid supply source, which deranges self-sufficiency of the apparatus for balancing bodies of revolution. Liquid supply from the stationary supply source hampers the use of a liquid with a greater specific gravity or the use of liquid metals which generally possess a pungent disagreable smell or poisonous properties.

Moreover, if the body of revolution initially rotates at subcritical and then at supercritical speeds, the apparatus for balancing bodies of revolution introduces additional unbalance with the liquid being fed into the distributing chamber at subcritical rotation speeds of the body of revolution.

SUMMARY OF THE INVENTION

An object of the present invention is to provide a self-contained apparatus for balancing bodies of revolution.

Another object of the present invention is to provide such an apparatus for balancing bodies of revolution which would permit the elimination of any unbalanced body of revolution at any position of the axis of rotation.

Yet another object of the present invention is to preclude the unbalance of the body of revolution rotating at subcritical speeds.

These objects are achieved by an apparatus for balancing bodies of revolution comprising balancing tanks located peripherally within the body of revolution, a distributing chamber mounted coaxially with the body of revolution and provided with conduits hydraulically connecting the distributing chamber with the balancing tanks, and whose ends are located inside the distributing chamber and are equidistant from the geometric axis of the body of revolution. A liquid supply source is hydraulically connected with the distributing chamber, and additionally contains resilient diaphragms fixed on the walls of the balancing tanks at the outlet of the conduits, and the liquid supply source is made in the form of a chamber with the diameter smaller than that of the distributing chamber, and is located centrally within the body of revolution and forms a tight cavity with the distributing chamber and the portion of the balancing tank defined by the resilient diaphragm.

To reduce the time of preparing the apparatus for a new operating cycle it is advantageous that the apparatus for balancing bodies of revolution additionally contain a bypass channel to return the liquid from the distributing chamber back into the liquid supply source as the resilient diaphragm compresses and closes the outlet of the conduits in the balancing tanks. which hydraulically connect the distributing chamber with the liquid supply source.

BRIEF DESCRIPTION OF THE DRAWINGS

Other objects and advantages of the present invention will hereinafter become more fully apparent from the following detailed description of the apparatus for balancing bodies of revolution, and with embodiments thereof being taken in conjunction with the accompanying drawings, wherein:

FIG. 1 is a side elevational view of a hand pneumatic grinder with revolution made in accordance with the invention;

FIG. 3 is a longitudinal sectional view of a balancing tank being filled with liquid and;

DETAILED DESCRIPTION OF THE INVENTION

Figure 2:
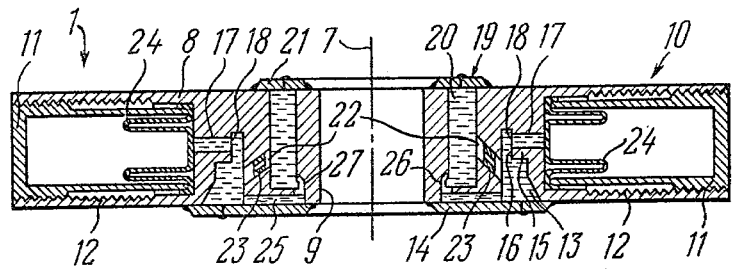
FIG. 2 is a sectional view of the apparatus for balancing bodies of revolution, taken along the line II—II of FIG. 4.
Figure 4:
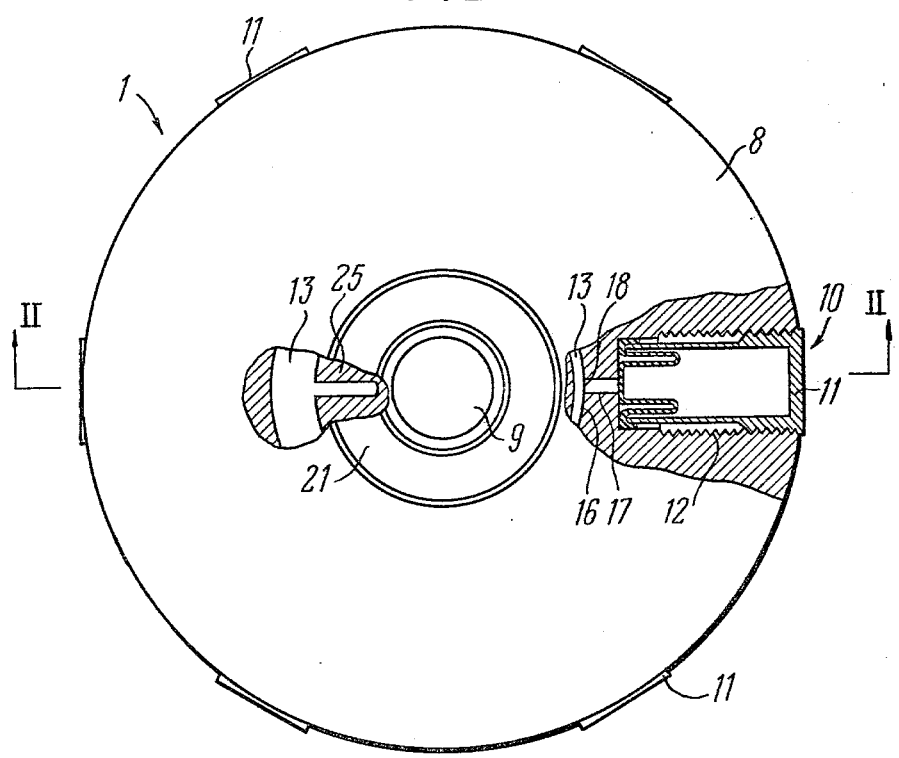
FIG. 4 is a partially cut away top plan view of the apparatus for balancing bodies of revolution.

The apparatus 1 (FIG. 1) for balancing bodies of revolution is mounted on a shaft 2 of a pneumatic grinder 3. The grinder 3 has a grinding wheel 4 (which in this particular case is the body of revolution) also fixed on the shaft 2. An axis 5 of the grinding wheel 4 coincides with an axis 6 of the shaft 2. A geometric axis 7 of the apparatus 1 coincides with the axis 5 of the grinding wheel 4 and the axis 6 of the shaft 2.

The apparatus 1 for balancing bodies of revolution comprises a housing 8 (FIG. 2) with a central hole 9, containing the shaft 2 (FIG. 1) fixed therein. The periphery of the apparatus 1 (FIG. 2) for balancing bodies of revolution carries six balancing tanks 10. The balancing tanks 10 are formed by sleeves 11 whose open portions face the geometric axis 7 and which are screwed into radial holes 12 made in the housing 8 of the apparatus 1 for balancing bodies of revolution.

Provided in the housing 8 coaxially with the grinding wheel 4 (FIG. 1) is a distributing chamber 13 (FIG. 2) closed by means of cover 14. The distributing chamber 13 has an annular shoulder 15 whose cylindrical surface 16 has an axis coinciding with the geometric axis 7 of the apparatus 1 for balancing bodies of revolution.

The annular shoulder 15 contains conduits 17 the distributing chamber 13 with each of the balancing tanks 10. Ends 18 of the conduits 17 are located inside the distributing chamber 13 and are equidistant from the geometric axis 7 of the housing 8 of the apparatus 1 for balancing bodies of revolution.

The central portion of the housing 8 contains a liquid supply source 19 representing an annular chamber 20 hermetically sealed with a cover 21. The external diameter of the annular chamber 20 of the liquid supply source 19 is smaller than the internal diameter of the distributing chamber 13. Four channels 22 connect the annular chamber 20 of the liquid supply source 19 at the places farthest from the geometric axis 7 of the housing 8. The channels 22 are provided with jets 23 for passing the required amount of the liquid from the liquid supply source 19 into the distributing chamber 13. A resilient diaphragm 24 (FIGS. 2, 3) is fitted at the outlet of the conduits 17 inside each of the balancing tanks 10. The ends of the diaphragm 24 are pinched and sealed between the housing 8 (FIG. 2) of the apparatus 1 for balancing bodies of revolution and the end face of the sleeve 11. As a result, the annular chamber 20 of the liquid supply source 19, the channels 22 with the jets 23, the distributing chamber 13 and the conduits 17 up to the resilient diaphragms 24 form a tight cavity filled with liquid. For close fitting of the resilient diaphragms 24 to the outlets of the conduits 17 the liquid pressure is brought down to that of saturated vapours.

To return the balancing liquid from the distributing chamber 13 back into the liquid supply source 19 as the resilient diaphragm 24 compresses and closes the outlets of the conduits 17 in the balancing tanks 10, the apparatus 1 for balancing bodies of revolution contains bypass channels 25 connecting the distributing chamber 13 with the annular chamber 20 of the liquid supply source 19. The by-pass channels 25 communicate with the annular chamber 20 of the liquid supply source 19 at the places where the annular chamber 20 is nearest to the geometric axis 7 of the apparatus 1 for balancing bodies of revolution. The bypass channels 25 (FIG. 3) are made in the form of radial slots associated with the annular chamber 20 (FIG. 2) of the liquid supply source 19 through holes 26. Said slots are also sealed with the cover 12.

The embodiments of the apparatus 1 for balancing bodies of revolution hereinabove described contain six balancing tanks 10. However, three balancing tanks 10 would suffice to ensure the balancing of a body of revolution in a preset correction plane. The balancing tanks 10 and the ends 18 of the conduits 17 hydraulically associated therewith in a radial direction are disposed in a common plane passing through the geometric axis 7 of the housing 8, which corresponds to the operation mode of the apparatus 1 for balancing bodies of revolution at supercritical speeds twice exceeding the critical speed of rotation. For balancing bodies of revolution rotating at a different speed, the angle between the planes containing the balancing tank 10 and the end 18 of the conduit 17 connected with said balancing tank 10 is taken within 0° to 180° with due allowance for the direction of displacement of the axis of rotation of the body of revolution and the direction of unbalance of the body of revolution.

The apparatus 1 for balancing bodies of revolution operates as follows.

The shaft 2 (FIG. 1) of the pneumatic grinder 3 mounts the apparatus 1 for balancing bodies of revolution in such a way that the geometric axis 7 of the apparatus 1 coincides with the axis 6 of the shaft 2. Then the grinding wheel 4 is installed on the shaft 2 in a manner allowing the axis 5 of the grinding wheel 4 to coincide with the geometric axis 7 of the apparatus 1 for balancing bodies of revolution. Compressed gas is fed into the pneumatic grinder 3 from a gas supply source (not shown in the drawing).

The shaft 2 of the pneumatic grinder 3 begins to rotate together with the apparatus 1 for balancing bodies of revolution and the grinding wheel 4. Initially, with the grinding wheel 4 rotating at subcritical speeds, the centrifugal forces are insignificant which may result in continuity of liquid in the apparatus for balancing bodies of revolution being ruptured.

Liquid being practically incompressible, it cannot drain from the distributing chamber 13, and the annular cavity 20 of the liquid supply source 19 into the balancing tanks 10 through the conduits 17, due to the resilient diaphragms 24 locking the outlets of the conduits 17 to block access of gas or liquid vapours inside the distributing chamber 13.

Low rotation speeds resulting in the liquid being trapped in the chamber 20 of the liquid supply source 19 and the distributing chamber 13 precludes the possibility for the apparatus 1 for balancing bodies of revolution to introduce additional unbalance. As the speed of rotation of the grinding wheel 4 gradually increases to attain supercritical values, when the centrifugal forces do not cause a break in the continuity of liquid in the apparatus 1 for balancing bodies of revolution, the liquid remains locked in the chamber 20 of the liquid supply source 19 and the distributing chamber 13, thus preventing balancing of the grinding wheel 4.

After the grinding wheel 4 has attained a supercritical rotation speed corresponding to the beginning of operation of the apparatus 1 for balancing bodies of revolution, the pressure of the liquid in the housing 8 of the apparatus 1 for balancing bodies of revolution drops below the pressure of saturated vapours. This results in liquid boiling up and losing its continuity in the distributing chamber 13 (FIG. 2) which is provided in the housing 8 and is sealed with the cover 14. The portion of the liquid above the level of the annular shoulder 15 of the distributing chamber 13 drains into the balancing tanks 10 through the conduits 17. The volume of this liquid being insignificant, it is equally distributed between all the balancing tanks 10, while the resilient diaphragms 10 expand to fit the inner surface of the sleeves 11 (FIG. 3).

Simultaneously, the continuity of liquid in the liquid supply source 19 (FIG. 2) is broken, and the liquid drains from the annular chamber 20 of the liquid supply source 19 into the distributing chamber 13 through the channels 22 provided with the jets 23. The jets 23 provided in the channels 22 regulate the amount of liquid flowing into the distributing chamber 13. The amount of the liquid passing through the channels 22 with the jets 23 from the liquid supply source 19 is smaller than the amount likely to be drained through any of the conduits 17 of the distributing chamber 13, which is favourable for a directional liquid flow in the distributing chamber 13 and for bypassing the liquid into the balancing tanks 10 to offset the unbalance.

With the grinding wheel 4 (FIG. 1) unbalanced, the axis of rotation is displaced in relation to the geometric axis 7 of the housing 8 (FIG. 2) of the apparatus 1 for balancing bodies of revolution.

The liquid in the distributing chamber 13 is redistributed and flows in a direction opposite to the displacement of the axis of rotation relative to the geometric axis 7 of the housing 8 of the apparatus 1 for balancing bodies of revolution. The ends 18 of the conduits 17 extending in the same direction are filled with the liquid flowing continuously from the liquid supply source 19 and drained into the appropriate balancing tank 10 through the conduit 17. As the liquid flows into the balancing tank 10 through the conduit 17, the resilient diaphragm 24 expands to fit the inner surface of the sleeve 11 (FIG. 3). The liquid accumulated in the balancing tanks 10 removes the unbalance of the grinding wheel 4 (FIG. 1). The unbalance offset, the liquid remaining in the liquid supply source 19 (FIG. 2) continues to drain into the distributing chamber 13 through the channels 22 having said jets 23. The liquid from the distributing chamber 13 is admitted into the balancing tanks 10 without distributing the balance attained.

After the supply of compressed gas into the pneumatic grinder 3 (FIG. 1) is discontinued and the apparatus 1 for balancing bodies of revolution is immobilized, the liquid returns to the initial position, which is favourable for a repeated balancing of the grinding wheel 4. The liquid being now out of action of the centrifugal forces, its vapours are condensed. The volume of the vapours in the liquid supply source 19 and the distributing chamber 13 is reduced, and the resilient diaphragms 24 are compressed, forcing the liquid from the balancing tanks 10 into the distributing chamber 13 through the conduits 17. Thence, the liquid flows into the liquid supply source 19 from the distributing chamber 13 through the channels 22. As a result, the liquid supply source 19 is again filled with liquid, and the resilient diaphragms 24 close the outlets of the conduits 17 into the balancing tanks 10.

Another embodiment of the apparatus with the bypass channels 25 operates in the balancing mode similarly to the apparatus hereinabove described.

As the balancing takes place, the liquid from the liquid supply source does not flow into the distributing chamber through the additional bypass channels 25, for the latter are connected with the annular chamber 20 of the liquid supply source 19 through the hole 26 at the place nearest to the geometric axis 7 of the apparatus 1 for balancing bodies of revolution.

With the apparatus 1 for balancing bodies of revolution at a standstill, the liquid is forced out of the balancing tanks 10 due to condensation of the liquid vapours and flows from the distributing chamber 13 into the annular chamber 20 of the liquid supply source 19 not only through the channels 22 with the jets 23, but also through the bypass channels 25.

As a result, the liquid from the distributing chamber 13 runs into the chamber 20 of the liquid supply source 19 along the radial slots of the bypass channels 25 and the holes 26 to accelerate filling of the liquid supply source 19 for a repeated balancing.

Thus, the proposed apparatus for balancing bodies of revolution is self-contained, does not require a liquid supply from the outside, and possesses high balancing precision. The proposed apparatus for balancing bodies of revolution is operable at any position of the axis of rotation of the body of revolution and does not introduce additional unbalance in a body of revolution rotating at subcritical speeds. Moreover, a substantial advantage of the proposed apparatus for balancing bodies of revolution is the possibility of using liquids with great specific gravities, which are generally detrimental to the environment.

Although the present invention has been described in some detail by way of illustration and example of purposes of clarity of understanding, it will, of course, be understood that various changes and modifications may be made in the form, details, and arrangements of the parts without departing from the scope of the invention as set forth in the following claims.

What is claimed is:

1. An apparatus for balancing a body of revolution with a vertical axis of rotation, comprising: a plurality of balancing tanks located peripherally within said body of revolution;

a distributing chamber, having an annular shoulder, mounted coaxially with said body of revolution, and hydraulically connected with said balancing tanks; conduits of said distributing chamber, made in the annular shoulder of said distributing chamber and hydraulically connecting said distributing chamber with said balancing tanks; one of the ends of said conduits being located inside said distributing chamber and equidistant from said axis of rotation of said body of revolution; and the other of said ends of said conduits being located inside said balancing tanks;

resilient diaphragms fixed on walls of said balancing tanks at the other ends or outlets of said conduits;

a balancing liquid supply source hydraulically associated with said distributing chamber; a chamber of said liquid supply source, having a diameter smaller than the diameter of said distributing chamber and located centrally within said body of revolution; and said chamber of the liquid supply source, the distributing chamber and part of said balancing tanks defined by said resilient diaphragm, and forming a fluid tight cavity.

2. An apparatus for balancing bodies of revolution according to claim 1, further comprising:

bypass channels for returning the balancing liquid from said distributing chamber back into said liquid supply source as said resilient diaphragm compresses and closes the other ends or outlets of said conduits in said balancing tanks, and said bypass channels hydraulically connecting said distributing chamber with said liquid supply source.

* * * * *